(12) United States Patent
Chen et al.

(10) Patent No.: US 10,754,479 B2
(45) Date of Patent: Aug. 25, 2020

(54) TOUCH SENSING SYSTEM AND DATA TRANSMISSION METHOD OF A TOUCH PANEL

(71) Applicant: AU OPTRONICS CORPORATION, Hsin-chu (TW)

(72) Inventors: Shan-Kang Chen, Hsin-chu (TW); Gui-Wen Liu, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/861,040

(22) Filed: Jan. 3, 2018

(65) Prior Publication Data

US 2018/0188853 A1 Jul. 5, 2018

(30) Foreign Application Priority Data

Jan. 5, 2017 (TW) .............................. 106100347 A (51) Int. Cl.
*G06F 3/044* (2006.01)
*G06F 3/041* (2006.01)
*G06F 3/0354* (2013.01)

(52) U.S. Cl.
CPC .......... *G06F 3/044* (2013.01); *G06F 3/03547* (2013.01); *G06F 3/0416* (2013.01); *G06F 2203/04112* (2013.01)

(58) Field of Classification Search
CPC .... G06F 3/044; G06F 3/03547; G06F 3/0416; G06F 2203/04112
USPC ....................................................... 345/174
See application file for complete search history.

(56) References Cited

U.S. PATENT DOCUMENTS

2009/0194344 A1 8/2009 Harley et al.
2011/0304583 A1* 12/2011 Kruglick ................. G06F 3/044
345/174
2013/0147760 A1 6/2013 Lai et al.
(Continued)

FOREIGN PATENT DOCUMENTS

CN 102725717 A 10/2012
CN 102916729 A 2/2013
(Continued)

OTHER PUBLICATIONS

Office Action issued by the State Intellectual Property Office of the Peoples Republic of China dated May 10, 2019 for Application No. CN201710092046.4.

*Primary Examiner* — Chanh D Nguyen
*Assistant Examiner* — Ngan T. Pham-Lu
(74) *Attorney, Agent, or Firm* — Tim Tingkang Xia, Esq.; Locke Lord LLP (57) ABSTRACT

A data transmission method applied to a touch panel includes: determining an overlapped quantity of at least one first touch electrode pad and at least one second touch electrode pad that are electrically coupled to each other; determining a transmission bit number according to the overlapped quantity; and making the at least one first touch electrode pad transmit at least one data signal to the at least one second touch electrode pad according to the transmission bit number and a transmission frequency, where the at least one first touch electrode pad is configured on a first electronic apparatus, and the at least one second touch electrode pad is configured on a second electronic apparatus.

16 Claims, 6 Drawing Sheets

(56) References Cited

U.S. PATENT DOCUMENTS

| | | | |
|---|---|---|---|
| 2014/0199944 A1* | 7/2014 | Ran | H04B 5/0087 455/41.1 |
| 2016/0345372 A1 | 11/2016 | Chiang et al. | |
| 2017/0123538 A1 | 5/2017 | Kuo et al. | |

FOREIGN PATENT DOCUMENTS

| CN | 103150066 A | 6/2013 |
|---|---|---|
| CN | 104715171 A | 6/2015 |

\* cited by examiner

TOUCH SENSING SYSTEM AND DATA TRANSMISSION METHOD OF A TOUCH PANEL

CROSS-REFERENCE TO RELATED PATENT APPLICATION

This non-provisional application claims priority to and the benefit of, pursuant to 35 U.S.C. § 119(a), patent application Serial No. 106100347 filed in Taiwan on Jan. 5, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention provides a touch sensing system and a data transmission method thereof, and in particular, to a touch sensing system adapted to self-capacitance sensing and a data transmission method thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a pointer, such as a finger or a stylus of a user touches a touch panel, a capacitance value of a touch sensing element of a touch system is changed, and therefore by means of monitoring the capacitance value in real time, the touch system can detect whether a touch event occurs and if the touch event occurs, an orientation where the touch event occurs. However, because a capacitor itself has an attribute of a coupling effect, capacitors can transmit data in a non-contact manner. Therefore, how to exchange information by using capacitance of the touch sensing element of the touch system is also one of directions of future development.

SUMMARY

To exchange information by using a touch system, the present invention provides an embodiment of a data transmission method applied to a touch panel, and steps thereof comprise: determining an overlapped quantity of at least one first touch electrode pad and at least one second touch electrode pad that are electrically coupled to each other; determining a transmission bit number and adjusting a transmission frequency according to the overlapped quantity; and making the at least one first touch electrode pad transmit at least one data signal to the at least one second touch electrode pad according to the transmission bit number and the transmission frequency, wherein the at least one first touch electrode pad is configured on a first electronic apparatus, and the at least one second touch electrode pad is configured on a second electronic apparatus.

The present invention further provides an embodiment of a touch sensing system, comprising: at least one first touch electrode pad and a first touch control unit, wherein the at least one first touch electrode pad is configured on a touch panel, and is configured to output at least one sensing signal; the first touch control unit is electrically coupled to the at least one first touch electrode pad, and is configured to transmit a plurality of signals to the at least one first touch electrode pad and receive the foregoing at least one sensing signal; the first touch control unit determines, according to the at least one sensing signal, an overlapped quantity of the at least one first touch electrode pad and at least one second touch electrode pad that are electrically coupled to each other; the first touch control unit determines a transmission bit number and a transmission frequency according to the received overlapped quantity; and the first touch control unit transmits at least one data signal to the at least one first touch electrode pad according to the transmission bit number and the transmission frequency.

According to the touch sensing system and the data transmission method of the present invention, a needed data signal can be transmitted only according to an overlapped quantity of at least one first touch electrode pad and at least one second touch electrode pad that are electrically coupled to each other, and therefore an electronic apparatus can further perform data transmission in a simple manner of the present invention in addition to sensing a touch event by using the touch sensing system, so as to increase convenience of data exchange.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 1A:
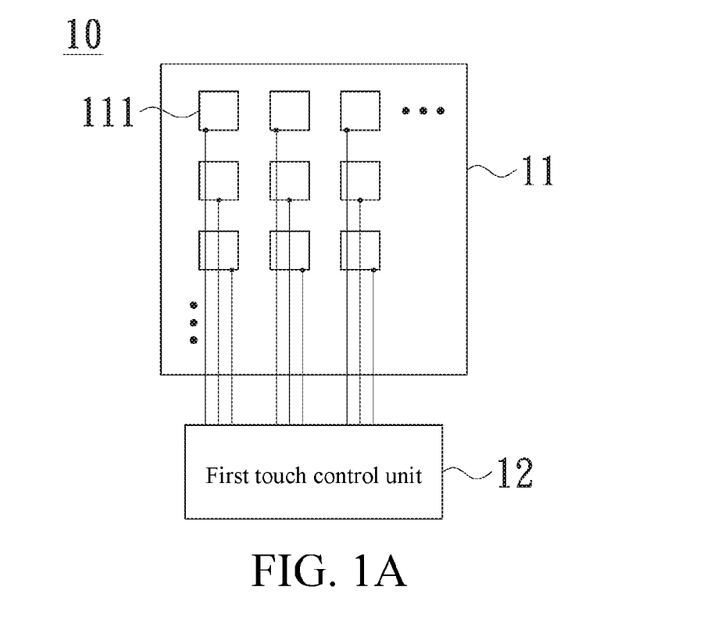
FIG. 1A is a schematic diagram of an embodiment of a touch sensing system of the present invention.

Referring to FIG. 1A which is a schematic diagram of an embodiment of a touch sensing system. A touch sensing system 10 comprises a first touch panel 11 and a first touch control unit 12. The first touch panel 11 comprises a plurality of first touch electrode pads 111. Each of the first touch electrode pads 111 is electrically coupled to the first touch control unit 12. The first touch electrode pads 111 are configured to output first sensing signals and receive a plurality of signals transmitted by the first touch control unit 12. The first touch control unit 12 is configured to receive the foregoing first sensing signals, and can further determine, according to the first sensing signals, whether the first touch electrode pads 111 receive information or signals in addition to determining, according to the received first sensing signals, whether a touch event occurs and if the touch event occurs, an position where the touch event occurs. In addition, the first touch control unit 12 is further configured to transmit a plurality of signals to the first touch electrode pads 111, so that the first touch electrode pads 111 generate corresponding potentials according to the received signals. The touch sensing system 10 may be configured on different electronic apparatuses, for example, a smartphone, a tablet computer, a television computer, or even an electronic lock, and not only can be configured to sense a touch event, but also can be used in application of information exchange.

Figure 1B:
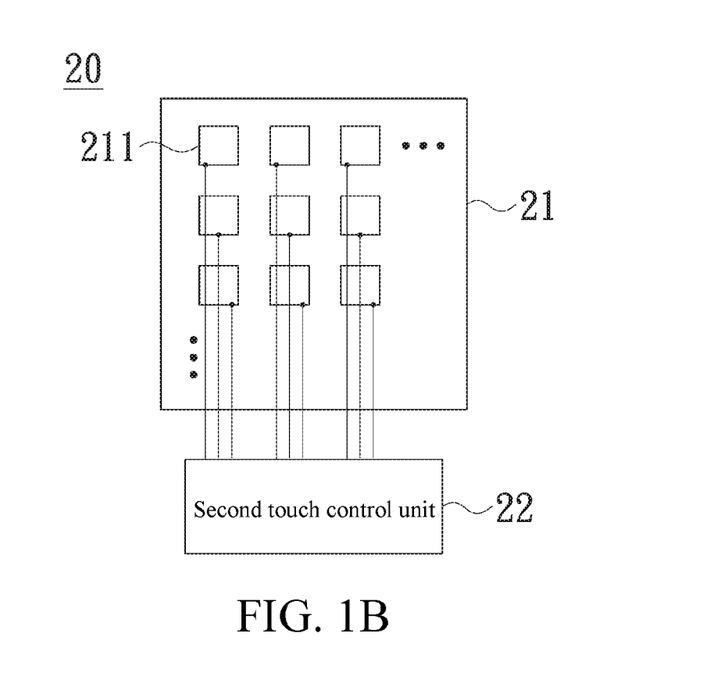
FIG. 1B is a schematic diagram of another embodiment of a touch sensing system of the present invention.

The touch sensing system 10 of the present invention and a data transmission method thereof are further described below with reference to figures. In the following embodiment, another touch sensing system 20 is further comprised in addition to the touch sensing system 10 shown in FIG. 1A. Referring to FIG. 1B, the touch sensing system 20 comprises a second touch panel 21 and a second touch control unit 22. The second touch panel 21 comprises a plurality of second touch electrode pads 211. Each of the second touch electrode pads 211 is electrically coupled to the second touch control unit 22. The second touch electrode pads 211 are configured to output a plurality of second sensing signals. In the following embodiment, description is made by using that the touch sensing system 10 and the touch sensing system 20 are configured in different electronic apparatuses as an example, for example, the touch sensing system 10 is configured in a smartphone, and the touch sensing system 20 is configured in a tablet computer.

Figure 2A:
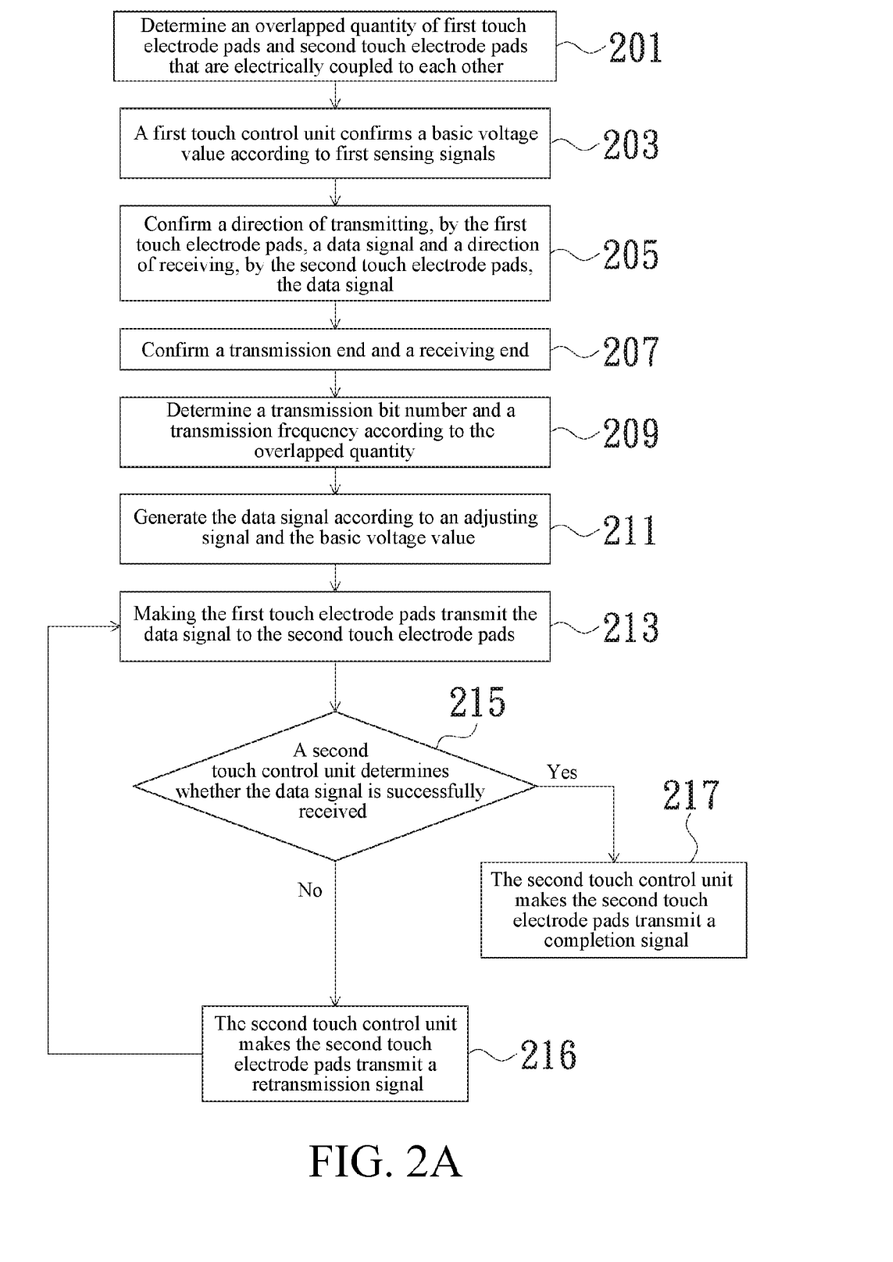
FIG. 2A is a schematic diagram of an embodiment of a data transmission method of the present invention.
Figure 3A:
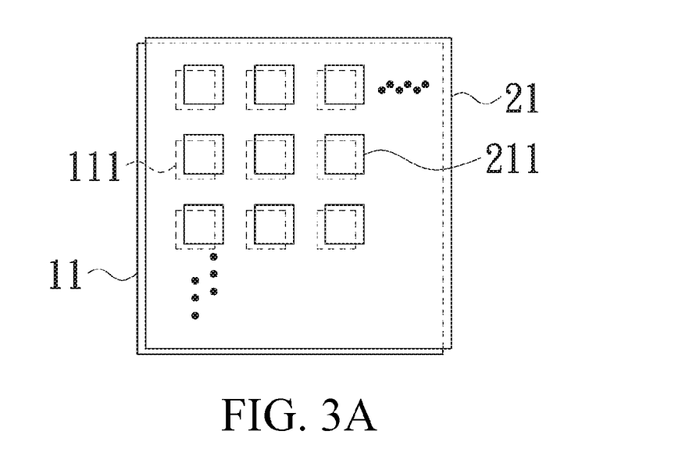
FIG. 3A is a schematic diagram of embodiment I of touch electrode pads that are electrically coupled to each other of the present invention.
Figure 3B:
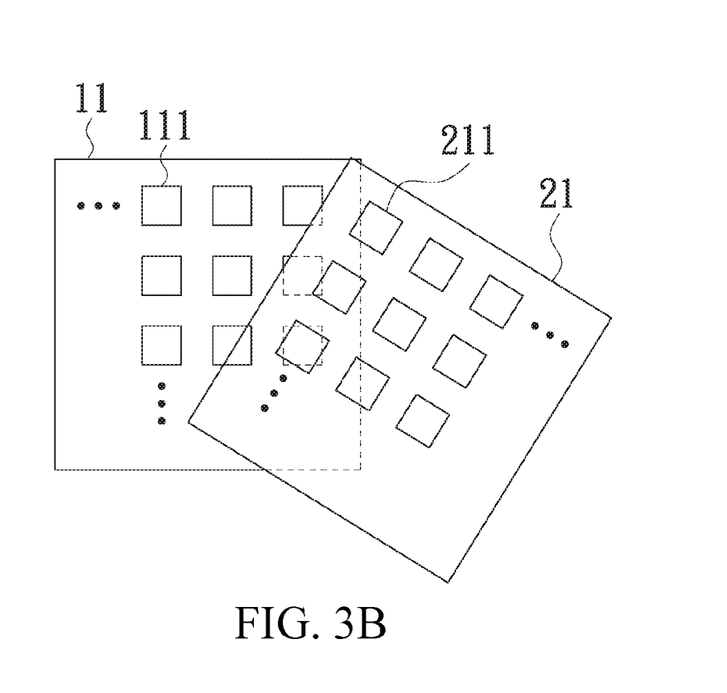
FIG. 3B is a schematic diagram of embodiment II of touch electrode pads that are electrically coupled to each other of the present invention.
Figure 3C:
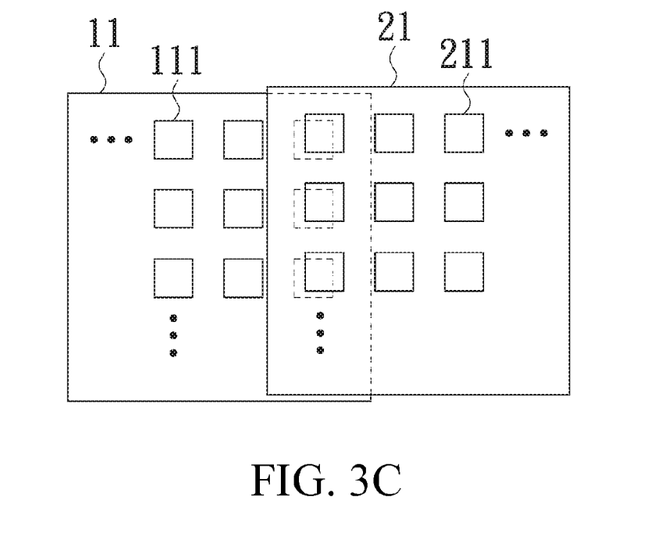
FIG. 3C is a schematic diagram of embodiment III of touch electrode pads that are electrically coupled to each other of the present invention.

Next, referring to FIG. 2A, FIG. 2A is an embodiment of a data transmission method of the present invention. When the touch sensing system 10 and the touch sensing system 20 are prepared to exchange data with each other, first in step 201, an overlapped quantity of the first touch electrode pads 111 and the second touch electrode pads 211 that are electrically coupled to each other is confirmed and determined first. Because the first touch panel 11 and the second touch panel 21 may be partially or completely overlapped with each other in different angles and directions, the plurality of first touch electrode pads 111 of the first touch panel 11 and the plurality of second touch electrode pads 211 of the second touch panel 21 may be partially or completely overlapping with each other to be electrically coupled, as shown in FIG. 3A, FIG. 3B, and FIG. 3C, but the present invention is not limited thereto. Therefore, the overlapped quantity of the first touch electrode pads 111 and the second touch electrode pads 211 that are electrically coupled to each other needs to be confirmed by step 201 first, then subsequent data exchange is performed.

Figure 2B:
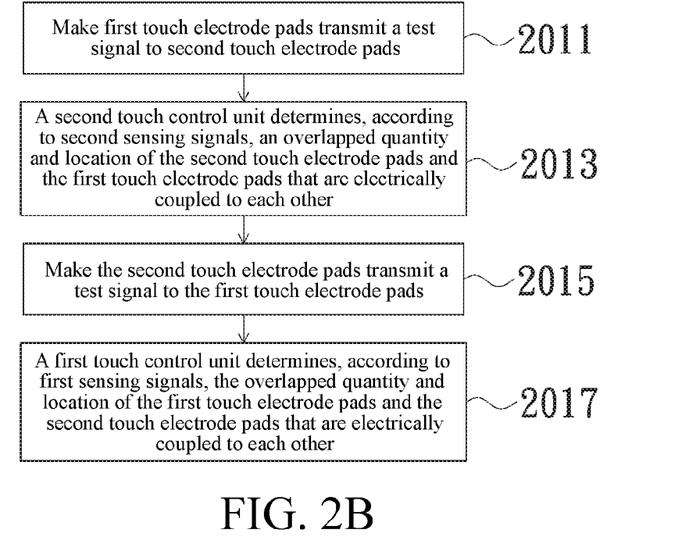
FIG. 2B is a schematic diagram of an embodiment of step 201 of a data transmission method of the present invention.

Next, first referring to FIG. 2B, FIG. 2B is an embodiment of step 201, which may comprise step 2011, step 2013, step 2015, and step 2017. First, in step 2011, to determine the overlapped quantity of the first touch electrode pads 111 and the second touch electrode pads 211 that are electrically coupled to each other, the first touch control unit 12 generates a test signal, and makes each of the first touch electrode pads 111 on the first touch panel 11 receive the foregoing test signal, and therefore the first touch electrode pads 111 generate corresponding potential changes according to the test signal. In this case, the plurality of second touch electrode pads 211 successfully electrically coupled to the first touch electrode pads 111 generates a plurality of second sensing signals according to the potentials of the first touch electrode pads 111 and a capacitance value between the first touch electrode pads 111 and the second touch electrode pads 211, and therefore the test signal is transmitted to the second touch electrode pads 211. In step 2013, the second touch control unit 22 receives the foregoing plurality of second sensing signals, and determines, according to the plurality of second sensing signals, an overlapped quantity of the second touch electrode pads 211 successfully electrically coupled to the first touch electrode pads 111. For example, whether the second touch electrode pads 211 are electrically coupled to the first touch electrode pads 111 is determined by means of determining a change of the sensed capacitance value. At the same time, the second touch control unit 22 can generate an adjusting signal according to the second sensing signals received in step 2013, wherein the adjusting signal comprises signal strength information of the received test signal. Then in step 2015, similar to step 2011, the second touch control unit 22 generates and transmits the foregoing test signal to the second touch electrode pads 211, so that the second touch electrode pads 211 transmit the test signal to the first touch electrode pads 111. In this step, all the second touch electrode pads 211 can be made to transmit the test signal, or according to a determining result of step 2013, the second touch electrode pads 211 electrically coupled to the first touch electrode pads 111 can be made to transmit the test signal, but the present invention is not limited thereto. In addition, in step 2015, the second touch electrode pads 211 can further transmit the foregoing adjusting signal to the first touch electrode pads 111 at the same time. Then, in step 2017, similar to step 2013, the first touch control unit 12 receives the first sensing signals output by the first touch electrode pads 111, and determines, according to the first sensing signals, the overlapped quantity of the first touch electrode pads 111 and the second touch electrode pads 211 that are electrically coupled to each other; at the same time, the first touch control unit 12 can receive the foregoing adjusting signal according to the first sensing signals; the first touch control unit 12 can adjust, according to the adjusting signal, strengths of signals output to the first touch electrode pads 111, so that the second touch electrode pads 211 can be successfully electrically coupled to each other by means of the first touch electrode pads 111 and receive the needed signals.

Referring to FIG. 2A again, after step 201 is completed, step 203 is performed next. In step 203, the first touch control unit 12 confirms a basic voltage value according to the first sensing signals output by all the first touch electrode pads 111. In some embodiments, the first touch control unit 12 can determine current environmental parameters, for example, a noise parameter of the first touch electrode pads 111 according to the plurality of first sensing signals output by the first touch electrode pads 111 after receiving information by means of the second touch electrode pads 211 and the plurality of first sensing signals output by the first touch electrode pads 111 without receiving information, and the first touch control unit 12 determines a basic voltage value needed by signal generation of the first touch control unit 12. The basic voltage value, for example, may be used as a basis for resisting a noise effect, and the first touch control unit 12 uses the basic voltage value as a basis to accordingly generate potentials of the needed signals. In addition, the first touch control unit 12 can further adjust signals to be transmitted in cooperation with the foregoing adjusting signal, so that the second touch electrode pads 211 can be successfully electrically coupled to the first touch electrode pads 111 and receive the needed signals.

Figure 2C:
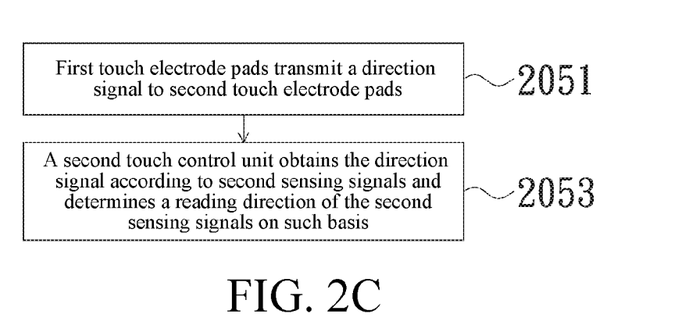
FIG. 2C is a schematic diagram of an embodiment of step 205 of a data transmission method of the present invention.
Figure 4:
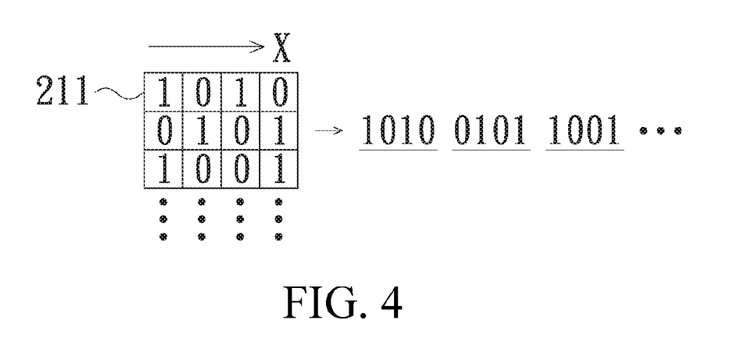
FIG. 4 is a schematic diagram of an embodiment of a reading direction of the present invention.

After step 203 is completed, step 205 is performed next: determining a direction of transmitting, by the first touch electrode pads 111, a data signal and a direction of receiving, by the second touch electrode pads 211, the data signal. The data signal is a data signal corresponding to data to be transmitted by the first touch electrode pads 111 to the second touch electrode pads 211. Because a single touch electrode pad transmits only a single data signal each time, for example, the data signal is a potential representing 0 or 1 of a binary code, the second touch electrode pads 211 can correctly receive the data signal transmitted by the first touch electrode pads 111 according to a direction only by determining the direction. In some embodiments, the step 205 may further comprise step 2051 and step 2053. Referring to FIG. 2C, in step 2051, the first touch control unit 12 first generates a direction signal, and transmits the direction signal to the first touch electrode pads 111 that can be electrically coupled to the second touch electrode pads 211, and therefore the second touch electrode pads 211 can obtain the foregoing direction signal by means of electric coupling and generate a plurality of second sensing signals on such basis. Therefore, in step 2053, the second touch control unit 22 obtains the foregoing direction signal according to the received plurality of second sensing signals, so as to obtain the direction of transmitting, by the first touch electrode pads 111, the data signal and the direction of receiving, by the second touch electrode pads 211, the data signal, thereby successfully reading and decoding the data signal as needed information after receiving the data signal. By using FIG. 4 as an example, suppose that the direction information comprised in the direction signal refers to X direction shown in the figure, the second touch control unit 22 reads, according to the X direction, the plurality of second sensing signals output by the second touch electrode pads 211. As shown in a left half part of FIG. 4, the second touch control unit 22 begins to read from left to right starting from the second touch electrode pads 211 in a first line; after the received second sensing signals are converted, the second touch control unit 22 obtains an information string corresponding to the data signal shown in a right half part of FIG. 4, and the second touch control unit 22 can obtain data transmitted by the first touch control unit 12 after decoding the information string of the data signal.

Figure 2D:
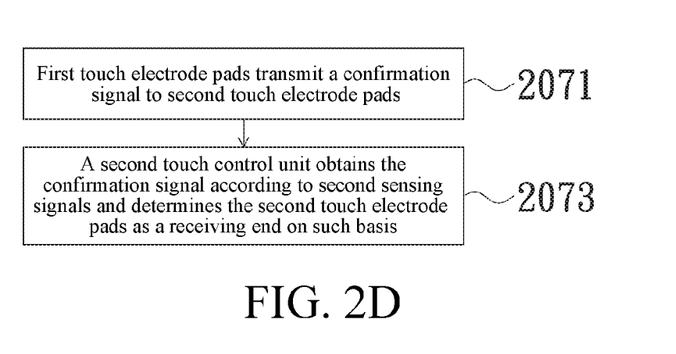
FIG. 2D is a schematic diagram of an embodiment of step 207 of a data transmission method of the present invention.

Next, in step 207 of FIG. 2A, the first touch electrode pads 111 and the second touch electrode pads 211 are determined as a transmission end or a receiving end to prepare subsequent data exchange. In other embodiments, the step 207 may further comprise step 2071 and step 2073. As shown in FIG. 2D, in step 2071, the first touch control unit 12 first generates a confirmation signal, and at the same time, therefore, the first touch control unit 12 determines the first touch electrode pads 111 as a transmission end, and the first touch control unit 12 transmits the confirmation signal to the first touch electrode pads 111 that can be electrically coupled to the second touch electrode pads 211, and therefore the second touch electrode pads 211 can obtain the foregoing confirmation signal by means of electric coupling and generate a plurality of second sensing signals on such basis. In step 2073, the second touch control unit 22 obtains the foregoing confirmation signal according to the received plurality of second sensing signals, and can determine the second touch electrode pads 211 as a receiving end according to the confirmation signal. In an embodiment, the transmitting end and the receiving end can be predetermined, and therefore step 207 can be omitted.

Next, in step 209 of FIG. 2A, because the first touch electrode pads 111 have been determined as the transmission end, the first touch control unit 12 codes a plurality of pieces of data to be transmitted, for example, files such as pictures, text, or films, to generate a plurality of coded signals, for example, a plurality of binary codes, to facilitate subsequent transmission. In addition, the first touch control unit 12 determines a transmission bit number of each time of transmission according to the overlapped quantity previously obtained in step 201, that is, a quantity of data signals that can be transmitted each time; the first touch control unit 12 selects a corresponding transmission frequency according to the overlapped quantity, for example, if a quantity of electrode pads that are electrically coupled to each other (the transmission bit number) is small, the first touch control unit 12 can improve a transmission frequency of the electrode pads, that is, can determine a transmission frequency band width of the current first touch electrode pads 111. Then, in step 211, the first touch control unit 12 converts, according to the foregoing adjusting signal and basic voltage value, the foregoing plurality of coded signals into a plurality of data signals for transmission; in this embodiment, that is, a transmission potential of a data signal corresponding to each coded signal is adjusted, so that the data signals are not affected by the foregoing noise and have sufficient signal strengths to make the second touch electrode pads 211 successfully received.

Figure 2E:
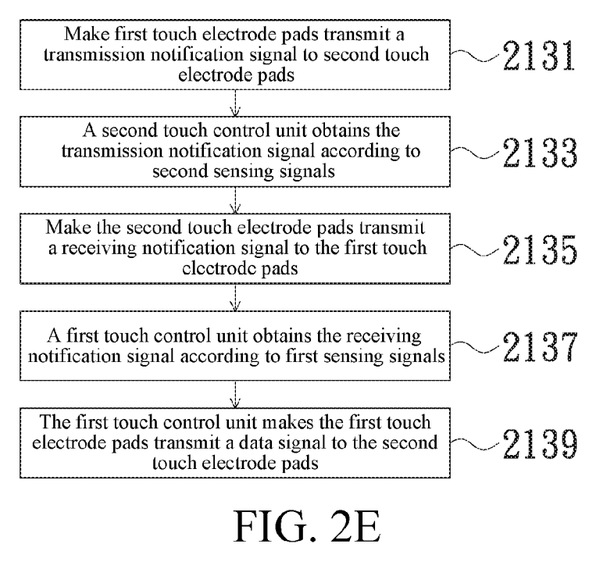
FIG. 2E is a schematic diagram of an embodiment of step 213 of a data transmission method of the present invention.

Then, in step 213, the first touch control unit 12 continuously transmits, according to the transmission bit number and the transmission frequency, the foregoing plurality of data signals to the first touch electrode pads 111 successfully coupled to the second touch electrode pads 211, so that the second touch electrode pads 211 can generate a plurality of second sensing signals on such basis, and therefore the second touch control unit 12 receives a plurality of second sensing signals, and can read the received plurality of second sensing signals according to the reading direction determined in step 205. In some embodiments, the step 213 further comprises step 2131, step 2133, step 2135, step 2137, and step 2139. Referring to FIG. 2E, in step 2131, the first touch control unit 21 first generates a transmission notification signal, which is used to notify the receiving end of preparing to start to receive the foregoing data signals; and the first touch control unit 12 transmits the transmission notification signal to the first touch electrode pads 111 electrically coupled to the second touch electrode pads 211, so that the transmission notification signal can be transmitted to the second touch electrode pads 211 by the first touch electrode pads 111. Next, in step 2133, the second touch electrode pads 211 generate a plurality of second sensing signals according to the transmission notification signal, and the second touch control unit 22 receives the plurality of second sensing signals, and obtains the foregoing transmission notification signal according to the obtained second sensing signals. In step 2135, the second touch control unit 22 accordingly generates a receiving notification signal after receiving the transmission notification signal, and the receiving notification signal is used to notify the first touch control unit 11 that the receiving end has been ready to start to receive the data signals; and the second touch control unit 22 transmits the receiving notification signal to the second touch electrode pads 211 electrically coupled to the first touch electrode pads 111, so that the first touch electrode pads 111 can receive the foregoing receiving notification signal by means of the second touch electrode pads 211. In step 2137, the first touch electrode pads 111 generate a plurality of first sensing signals according to the receiving notification signal, and the first touch control unit 12 receives the plurality of first sensing signals, and obtains the receiving notification signal according to the obtained first sensing signals. Therefore, in step 2139, after receiving the receiving notification signal, the first touch control unit 12 starts to continuously transmit, according to the transmission bit number and the transmission frequency, the foregoing plurality of data signals to the first touch electrode pads 111 electrically coupled to the second touch electrode pads 211, and therefore the second touch electrode pads 211 continuously receive the plurality of data signals and generate the corresponding plurality of second sensing signals, and step 213 is completed after step 2139 is completed.

Figure 2F:
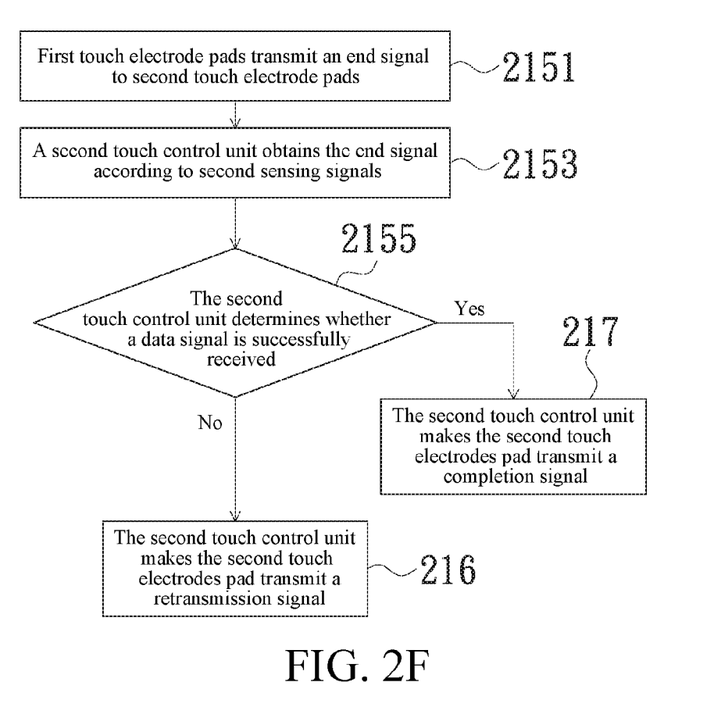
FIG. 2F is a schematic diagram of an embodiment of step 215 of a data transmission method of the present invention.

After step 213 of FIG. 2A is completed, step 215 is performed next: the second touch control unit 22 determines whether all the data signals are successfully received. In some embodiments, the step 215 further comprises step 2151, step 2153, and step 2155. Referring to FIG. 2F, in step 2151, when transmission of the data signals is completed, the first touch control unit 12 generates an end signal, and transmits the end signal to the first touch electrode pads 111 electrically coupled to the second touch electrode pads 211, and therefore the second touch electrode pads 211 receive the end signal and generate the corresponding second sensing signals. In step 2153, the second touch control unit 22 receives the plurality of second sensing signals, and obtains the foregoing end signal according to the second sensing signals, and therefore the second touch control unit 22 can obtain that transmission of the data signals on the transmission end is completed. Next, in step 2155, the second touch control unit 22 determines whether all the data signals are successfully received; when it is determined that all the data signals are successfully received, step 217 is executed, and otherwise, step 216 is executed.

In step 216 of FIG. 2A, because the second touch control unit 22 determines, in step 2155, that reception of the data signals is not completed, the second touch control unit 22 generates a retransmission signal, which comprises related information of data signals that are not successfully received, and the second touch control unit 22 transmits the retransmission signal to the plurality of second touch electrode pads 211 electrically coupled to the first touch electrode pads 111, and then performs step 213 again, so that the first touch control unit 12 performs transmission of the data signals again according to the received retransmission signal. For example, it is predicted that the first touch control unit 12 transmits a data packet S1, a data packet S2, a data packet S3, a data packet S4, and a data packet S5 to the second touch control unit 22, and each of the data packets comprises a plurality of data signals, for example, data signals having a same quantity as that of the transmission bit number. After the first touch control unit 12 completes step 213, the second touch control unit 22 determines, according to step 215, whether all the data packets are correctly received; suppose in step 215, the second touch control unit 22 determines that the data packets S2 are not correctly received, the second touch control unit 22 generates the retransmission signal that comprises related information that the data packet S2 is not correctly received, and therefore after the first touch control unit 12 receives the retransmission signal by means of the first touch electrode pads 111, the first touch control unit 12 performs step 213 again according to the retransmission signal, so as to transmit the data packet S2 again. In step 217, because the second touch control unit 22 determines, in step 2155, that reception of the data signals is completed, the second touch control unit 22 generates a completion signal, and transmits the completion signal to the plurality of second touch electrode pads 211 electrically coupled to the first touch electrode pads 111, so that the first touch electrode pads 111 can receive the foregoing completion signal; after the first touch control unit 12 receives the first sensing signals generated according to the completion signal, a procedure of data exchange is ended.

Based on the above, because according to the present invention, data exchange can be performed by means of two touch electrode pads that are electrically coupled to each other, touch electrode pads of a touch panel can be touched to perform data exchange without additionally configuring electronic elements or circuits for wireless communication on an electronic apparatus. In addition, the touch electrode pads that are electrically coupled to each other do not need to be configured in particular directions or angles, and convenience of performing data exchange by different electronic apparatuses is further increased. In addition, a transmission frequency band width can be greatly increased by means of adjusting a quantity of touch electrode pads that are electrically coupled to each other and a transmission frequency, so as to conveniently transmit various data that needs large frequency band widths, for example, pictures or films.

The present invention is disclosed through the foregoing embodiments; however, these embodiments are not intended to limit the present invention. Various changes and modifications made without departing from the spirit and scope of the present invention shall fall within the protection scope of the present invention. The protection scope of the present invention is subject to the appended claims.

What is claimed is:

1. A data transmission method applied to a touch panel, wherein steps thereof comprise:
   determining an overlapped quantity of a plurality of first touch electrode pads and a plurality of second touch electrode pads that are electrically coupled to each other;
   determining a transmission bit number and a transmission frequency of at least one data signal according to the overlapped quantity, wherein a transmission frequency bandwidth is increased by adjusting the overlapped quantity and the transmission frequency; and making the plurality of first touch electrode pads transmit the at least one data signal to the plurality of second touch electrode pads according to the transmission bit number and the transmission frequency, wherein the plurality of first touch electrode pads is configured on a first electronic apparatus, and the plurality of second touch electrode pads is configured on a second electronic apparatus; and wherein the step of determining the overlapped quantity of the plurality of first touch electrode pads and the plurality of second touch electrode pads that are electrically coupled to each other further comprises:

making the plurality of first touch electrode pads transmit a test signal to the plurality of second touch electrode pads;

determining, by a second touch control unit, the overlapped quantity of the plurality of second touch electrode pads and the plurality of first touch electrode pads that are electrically coupled to each other according to a plurality of sensing signals output by the plurality of second touch electrode pads;

making the at least one second touch electrode pad transmit the test signal to the at least one first touch electrode pad, and at the same time, making the at least one second touch electrode pad transmit an adjusting signal to the at least one first touch electrode pad, the adjusting signal comprising signal strength information of the received test signal; and determining, by a first touch control unit, the overlapped quantity of the plurality of first touch electrode pads and the plurality of second touch electrode pads that are electrically coupled to each other according to the sensing signals output by the at least one first touch electrode pad, and at the same time, making the first touch control unit receive the adjusting signal and adjust, according to the adjusting signal, strengths of signals output to the at least one first touch electrode pad.

2. The data transmission method according to claim 1, further comprising: determining a basic voltage value, and a step of confirming the basic voltage value further comprises:

determining, by the first touch control unit, the basic voltage value according to the sensing signals output by the at least one first touch electrode pad.

3. The data transmission method according to claim 2, further comprising:

confirming a direction of transmitting, by the plurality of first touch electrode pads, the at least one data signal and a direction of receiving, by the plurality of second touch electrode pads, the at least one data signal.

4. The data transmission method according to claim 3, wherein the step of confirming a direction of transmitting, by the plurality of first touch electrode pads, the at least one data signal and a direction of receiving, by the plurality of second touch electrode pads, the at least one data signal further comprises:

transmitting, by the plurality of first touch electrode pads, a direction signal to the plurality of second touch electrode pads; and obtaining, by the second touch control unit, the direction signal according to the sensing signals output by the plurality of second touch electrode pads, and determining a reading direction of the at least one data signal on such basis.

5. The data transmission method according to claim 4, further comprising: determining a transmission end and a receiving end, and a step of confirming the transmission end and the receiving end further comprises:

making the plurality of first touch electrode pads transmit a confirmation signal to the plurality of second touch electrode pads; and obtaining, by the second touch control unit, the confirmation signal according to the sensing signals generated by the plurality of second touch electrode pads, and determining the plurality of second touch electrode pads as the receiving end on such basis.

6. The data transmission method according to claim 5, further comprising:

generating, by the first touch control unit, the at least one data signal according to the adjusting signal and the basic voltage value.

7. The data transmission method according to claim 1, wherein the step of making the plurality of first touch electrode pads transmit the at least one data signal to the plurality of second touch electrode pads according to the transmission bit number and the transmission frequency further comprises:

making the plurality of first touch electrode pads transmit a transmission notification signal to the plurality of second touch electrode pads;

obtaining, by a second touch control unit, the transmission notification signal according to a plurality of sensing signals generated by the plurality of second touch electrode pads;

making the plurality of second touch electrode pads transmit a receiving notification signal to the plurality of first touch electrode pads;

obtaining, by a first touch control unit, the receiving notification signal according to a plurality of sensing signals generated by the at least one first touch electrode pad; and making, by the first touch control unit, the plurality of first touch electrode pads transmit the plurality of data signals to the least one second touch electrode pad according to the transmission bit number.

8. The data transmission method according to claim 7, further comprising:

making the plurality of first touch electrode pads transmit an end signal to the plurality of second touch electrode pads;

obtaining, by the second touch control unit, the end signal according to the sensing signals generated by the at least one second touch electrode pad;

determining, by the second touch control unit, whether the at least one data signal is successfully received;

when it is determined that the at least one data signal is successfully received, making, by the second touch control unit, the plurality of second touch electrode pads transmit a completion signal to the at least one first touch electrode pad;

when it is determined that the at least one data signal is not successfully received, making, by the second touch control unit, the plurality of second touch electrode pads transmit a retransmission signal to the at least one first touch electrode pad; and obtaining, by the first touch control unit, the retransmission signal according to the sensing signals generated by the plurality of first touch electrode pads, and making, according to the retransmission signal, the plurality of first touch electrode pads transmit the corresponding at least one data signal.

9. A touch sensing system, comprising:
a plurality of first touch electrode pads, configured on a touch panel, wherein the plurality of first touch electrode pads is configured to output a plurality of sensing signals; and
a first touch control unit, electrically coupled to the plurality of first touch electrode pads, wherein the first touch control unit is configured to transmit a plurality of signals to the plurality of first touch electrode pads and receive the sensing signals; the first touch control unit determines, according to the sensing signals, an overlapped quantity of the plurality of first touch electrode pads and the plurality of second touch electrode pads that are electrically coupled to each other; the first touch control unit determines a transmission bit number and a transmission frequency according to the overlapped quantity; and the first touch control unit transmits the plurality of data signals to the plurality of first touch electrode pads according to the transmission bit number and the transmission frequency;
wherein a transmission frequency bandwidth is increased by adjusting the overlapped quantity and the transmission frequency; and
wherein the first touch control unit obtains a test signal according to the sensing signals, and at the same time, the first touch control unit obtains an adjusting signal according to the sensing signals, the adjusting signal comprising signal strength information of the received test signal; and the first touch control unit determines, according to the test signal, the overlapped quantity of the plurality of first touch electrode pads and the plurality of second touch electrode pads that are electrically coupled to each other, and at the same time, the first touch control unit receives the adjusting signal and adjusts, according to the adjusting signal, strengths of signals output to the first touch electrode pads.

10. The touch sensing system according to claim 9, wherein the first touch control unit transmits a test signal to the plurality of first touch electrode pads; the test signal is configured to determine the overlapped quantity of the plurality of first touch electrode pads and the plurality of second touch electrode pads that are electrically coupled to each other.

11. The touch sensing system according to claim 9, wherein the first touch control unit confirms a basic voltage value according to the sensing signals.

12. The touch sensing system according to claim 11, wherein the first touch control unit generates the plurality of data signals according to the adjusting signal and the basic voltage value.

13. The touch sensing system according to claim 9, wherein the first touch control unit transmits a direction signal to the plurality of first touch electrode pads; the direction signal is configured to determine a direction of transmitting, by the plurality of first touch electrode pads, the plurality of data signals.

14. The touch sensing system according to claim 9, wherein the first touch control unit obtains a direction signal according to the sensing signals, and the direction signal is configured to determine a direction of receiving, by the plurality of first touch electrode pads, the plurality of data signals.

15. The touch sensing system according to claim 9, wherein the first touch control unit transmits a confirmation signal to a plurality of first touch electrode pads, and the first touch control unit determines the plurality of first touch electrode pads as a transmission end according to the confirmation signal.

16. The touch sensing system according to claim 9, wherein the first touch control unit obtains a confirmation signal according to the sensing signals, and the first touch control unit determines the plurality of first touch electrode pads as a receiving end according to the confirmation signal.

* * * * *